(12) United States Patent
Rinaldi et al.

(10) Patent No.: US 7,712,308 B2
(45) Date of Patent: May 11, 2010

(54) SELECTIVE CATALYST REDUCTION OF NITROGEN OXIDES WITH HYDROGEN

(75) Inventors: Fabrizio C. Rinaldi, Jackson, MI (US); Ralph T. Yang, Ann Arbor, MI (US); Gongshin Qi, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 1024 days.

(21) Appl. No.: 11/269,124

(22) Filed: Nov. 8, 2005

(65) Prior Publication Data

US 2007/0104633 A1    May 10, 2007

(51) Int. Cl.
*F01N 3/10*    (2006.01)
(52) U.S. Cl. .............................. 60/301; 60/274; 60/286; 60/297; 60/303; 422/172; 422/177; 423/239.1
(58) Field of Classification Search ................... 60/285, 60/286, 274, 297, 301, 303; 422/170, 171, 422/172, 177, 182; 423/235, 237, 239.1
See application file for complete search history.

(56) References Cited

U.S. PATENT DOCUMENTS

| | | | | |
|---|---|---|---|---|
| 5,527,755 A * | 6/1996 | Wenski et al. | ................ | 502/325 |
| 5,882,607 A * | 3/1999 | Miyadera et al. | ............. | 422/177 |
| 5,922,294 A * | 7/1999 | Chattha et al. | ............ | 423/213.5 |
| 6,119,452 A * | 9/2000 | Kinugasa et al. | .............. | 60/285 |
| 6,325,984 B1 * | 12/2001 | Yeh et al. | ................. | 423/239.1 |
| 6,685,899 B1 * | 2/2004 | Park | ......................... | 423/213.5 |
| 6,739,125 B1 | 5/2004 | Mulligan | | |
| 6,785,035 B2 * | 8/2004 | Uematsu et al. | ............. | 359/265 |
| 6,818,582 B2 | 11/2004 | Maunula | | |
| 6,832,473 B2 * | 12/2004 | Kupe et al. | .................. | 60/286 |
| 6,887,444 B1 | 5/2005 | Yamamoto | | |
| 6,895,746 B2 | 5/2005 | Buglass et al. | | |
| 6,919,047 B1 | 7/2005 | He et al. | | |
| 7,093,428 B2 * | 8/2006 | LaBarge et al. | ............... | 60/286 |
| 7,213,395 B2 * | 5/2007 | Hu et al. | ...................... | 60/286 |
| 7,264,785 B2 * | 9/2007 | Blakeman et al. | ........ | 423/213.2 |
| 2005/0103001 A1 | 5/2005 | Kupe et al. | | |
| 2005/0129601 A1 | 6/2005 | Li et al. | | |

OTHER PUBLICATIONS

Atsushi Ueda, Takayuki Nakao, Masashi Azuma, Tetsuhiko Kobayashi, "Two Conversion Maxima at 373 and 573 K in the Reduction of Nitrogen Monoxide with Hydrogen over Pd/TiO2 Catalyst," Catalysis Today 45 (1998) pp. 135-138.

Norman Macleod, Richard M. Lambert, "Lean NOx Reduction with CO + H2 Mixtures Over Pt/Al2O3 and Pd/Al2O3 Catalysts," Applied Catalysis B: Environmental 35 (2002) pp. 269-279.

(Continued)

*Primary Examiner*—Binh Q Tran
(74) *Attorney, Agent, or Firm*—Harness, Dickey & Pierce, P.L.C.

(57) ABSTRACT

A system and method for reducing nitrous oxides in diesel exhaust with hydrogen and carbon monoxide over a palladium based catalyst. The catalyst comprises a compound represented by the formula: X % Pd—Y % $V_2O_5$/Z, where X is between about 0.1 to about 2.0, Y is between about 0.1 to about 7.0, and Z is an oxide support.

21 Claims, 11 Drawing Sheets

OTHER PUBLICATIONS

Norman Macleod, Rachael Cropley and Richard M. Lambert, "Efficient Reduction of NOx by H2 Under Oxygen-Rich Conditions Over Pd/TiO2 Catalysts: An in situ DRIFTS Study," Catalysis Letters vol. 86, Nos. 1-3, Mar. 2003, pp. 69-75.

Norman Macleod and Richard M. Lambert, "Selective NOx Reduction During the H2 + NO + O2 Reaction Under Oxygen-Rich Conditions Over Pd/V2O5/Al2O3: Evidence for in situ Ammonia Generation." Catalysis Letters vol. 90, Nos. 3-4, Oct. 2003.

Gongshin Qi, Ralph T. Yang, Levi T. Thompson, "Catalytic Reduction of Nitric Oxide with Hydrogen and Carbon Monoxide in the Presence of Excess Oxygen by Pd Supported on Pillared Clays," Applied Catalysis A: General 259 (2004), pp. 261-267.

Norman Macleod and Richard M. Lambert, "An in situ DRIFTS study of efficient lean NOx reduction with H2 + CO over Pd/Al2O3: the key role of transient NCO formation in the subsequent generation of ammonia," Applied Catalysis B: Environmental 46 (2003) pp. 483-495.

\* cited by examiner

SELECTIVE CATALYST REDUCTION OF NITROGEN OXIDES WITH HYDROGEN

FIELD OF THE INVENTION

The present invention relates to the catalytic reduction of nitrogen oxides.

BACKGROUND OF THE INVENTION

Nitrogen oxides, in particular NO and $NO_2$ ($NO_x$), resulting from combustion processes continue to be a major source of air pollution. They contribute to photochemical smog, acid rain, ozone depletion, ground level ozone, and greenhouse effects. More than 95% of nitrogen oxide emissions are derived from two sources: ~49% from mobile sources, such as vehicles, and ~46% from stationary sources, such as power plants. Many technologies have been developed in an attempt to decrease such emissions.

Three-way catalysis is very effective for removing emissions from gasoline engines, where narrow band oxygen sensors afford closed loop control with an air:fuel ratio of about 14.07. Diesel engines, on the other hand, operate very lean and with a wide-band air:fuel ratio of about 14 to about 24. While diesel engines have considerable benefits to gasoline engines, due to the nature of diesel fuel and the compression ignition combustion process, diesel engines emit a high quantity of particulate matter and nitrogen oxide emissions. Many catalysts useful for gasoline engines are not suitable for use in a diesel engine exhaust stream as a wider operating temperature window is required.

The current commercially available technology for reducing $NO_x$ emissions from stationary sources is selective catalytic reduction (SCR). Ammonia ($NH_3$) is widely accepted as the reducing agent of choice. Similar SCR technology is also effectively applied to mobile sources, where $NH_3$ is usually generated by the thermal decomposition of urea. However, there are many commercial and logistical drawbacks, namely: (1) a separate tank and injection system is required, (2) several issues exist relating to $NH_3$ slip, (3) the difficulty of handling urea solutions during cold conditions, and (4) as of yet, no real infrastructure exists to widely deploy the necessary urea solution. These factors indicate the desirability of the development of an active $NO_x$ reduction catalyst that makes use of other reductants, such as hydrogen. Hydrogen has been shown to be a promising reductant for $NO_x$ under lean burn conditions and will most likely be available in automobiles from fuel processors for fuel cell applications, on-board reforming of diesel fuel, or the like.

SUMMARY OF THE INVENTION

The present invention provides an emissions treatment system and methods for reducing contaminants in diesel exhaust streams containing nitrous oxides ($NO_x$). The system includes a catalytic converter having at least one inlet, at least one outlet, and an interior working environment adapted to receive and dispel exhaust. A catalyst is disposed in the interior working environment and comprises a compound represented by the formula: X % Pd—Y % $V_2O_5$/Z, where X is a weight percent between about 0.1 to about 2.0, Y is a weight percent between about 0.1 to about 7.0, and Z is a high surface area support material. A reducing agent is provided comprising $H_2$ and CO at a ratio of $H_2$:CO from about 1:1 to about 3:1. The reducing agent is mixed with diesel engine exhaust and the mixture is injected into the interior working environment of the converter where the catalyst reduces $NO_x$ present in the exhaust.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
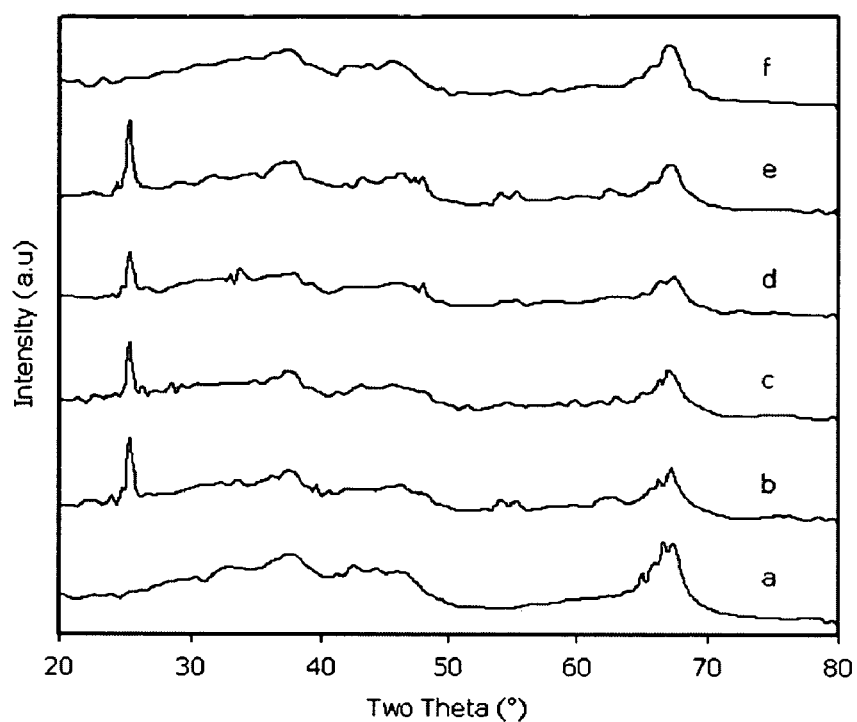
FIG. 1 illustrates XRD patterns of the catalysts (a) $Al_2O_3$; (b) 20% $TiO_2/Al_2O_3$; (c) 5% $V_2O_5$/20% $TiO_2/Al_2O_3$; (d) 1% Pd-5% $V_2O_5TiO_2/Al_2O_3$; (e) 1% Pd/20% $TiO_2/Al_2O_3$; and (f) 1% Pd-5% $V_2O_5/Al_2O_3$.

The following description of the preferred embodiment(s) is merely exemplary in nature and is in no way intended to limit the invention, its application, or uses.

The present invention relates to an emissions treatment system for reducing contaminants in diesel exhaust streams containing nitrous oxides ($NO_x$). While the decomposition of $NO_x$ to innocuous components is thermodynamically favored with the temperatures and pressures affiliated with diesel exhaust, the reactions are inhibited by high activation energies and require a catalyst to facilitate the decomposition. As is widely known, however, the performance of many catalysts deteriorates in the presence of oxygen. Various catalysts have been used to decompose $NO_x$ and include precious metals, metallic oxides, zeolites, and similar materials fixed to a suitable carrier. The present invention is directed to the novel use of selective catalytic reduction of $NO_x$ with hydrogen ($H_2$-SCR) using palladium. In preferred embodiments, the catalyst reduces the $NO_x$ in-situ, and not as part of a $NO_x$ adsorbing reaction.

In various embodiments, the present invention provides an emissions system and methods of reducing $NO_x$ in lean-burn diesel engine exhaust. The system is operable throughout the wide range of normal operating temperatures of diesel engines, typically between about 125 to about 650° C., and has an efficiency of greater than about 87%, more preferably, greater than about 95%. In various embodiments, the system operates with the exhaust having a flow rate of between about 200 and about 700 kg/hr, and a space velocity through the interior working environment of between about 9,000 and about 70,000 $hr^{-1}$.

The system of the present invention includes a catalytic converter having at least one inlet, an outlet, and an interior working environment adapted to receive and dispel an exhaust. A catalyst is disposed in the interior working environment and comprises a compound represented by the formula: X % Pd—Y % $V_2O_5$/Z, where X is a weight percent between about 0.1 to about 2.0, Y is a weight percent between about 0.1 to about 7.0, and Z is a high surface area support material. The catalyst is incorporated into the exhaust system at such a position that yields optimum efficiencies with a fast light-off time period.

The support for the catalyst typically comprises a high surface area refractory metal oxide. Dispersed within the oxide layer is the palladium metal component. Without being bound by theory, the palladium promotes the oxidation and reduction of nitrogen species and is present in an amount of between about 0:1 to about 2% by weight of the catalyst. The catalyst coating thickness and supporting materials will vary according to the targeted reduction of $NO_x$. Non-limiting examples of suitable oxide support materials include alumina, titania, zirconia; mixtures of alumina with one or more of titania, zirconia, and ceria; ceria coated on alumina; and titania coated on alumina. The metal oxide may also comprise a mixed oxide, such as silica-alumina, amorphous or crystalline aluminosilicates, alumina-zirconia, alumina chromia, and alumina ceria. Presently preferred metal oxides include gamma alumina and titania coated on alumina. In certain embodiments, the support material comprises a pillared interlayered clay (PILC), such as Ti-PILC. In various embodiments, the catalyst further comprises at least one promoter. Non-limiting examples of suitable promoters include: Ce, Mn, Zr, La, Gd, Nb, Pr, Nd, Sm, Eu, and combinations thereof. Typically, the promoter, if any, is present in an amount between about 0.01 and about 20% by weight of the catalyst.

In various embodiments, the metal oxide will have a surface area of from about 50 to about 300 $m^2$/g or more. In presently preferred embodiments, the oxide support material is present in an amount having a loading per unit volume of between about 0.5 to about 10 g/$in^3$. As should be understood to those skilled in the art, the ratio of substrate length to diameter, or frontal surface area to volume, should be optimized based on the exhaust flow rate and the targeted $NO_x$ reduction.

The SCR catalyst of the present invention can be in the form of self supporting catalyst particles, for example as a packed bed, or the catalyst can be supported on a metal or ceramic honeycomb structure, or the like. In other embodiments, the catalyst composition can be disposed as a washcoat or as a combination of washcoats on a ceramic or metallic substrate.

A reducing agent comprising $H_2$ and CO is provided to assist in the reduction reactions. In presently preferred embodiments, the reducing agent comprises a ratio of H2:CO of from about 1:1 to about 3:1, with the latter more preferable. In certain embodiments, hydrocarbons can be used in addition to or in place of the CO. The reducing agent is mixed with diesel engine exhaust and the mixture is injected into the interior working environment for the catalyst to reduce the nitrous oxides present in the exhaust. In certain embodiments, a mixing element is provided having a first input coupled to a reducing agent source, a second input coupled for receipt of diesel engine exhaust, and at least one output. The diesel engine exhaust mixed with the reducing agent is injected into the interior working environment of the converter where the catalyst reduces nitrous oxides present in the exhaust. In various embodiments, the reducing agent is in the form a reducing fuel that is produced on-board a vehicle. In this instance, a fuel reformer is provided to convert a sufficient amount of diesel fuel, oxygen, and moisture into $H_2$ and CO. In other embodiments, $H_2$ may also be provided from other sources, such as from a fuel cell application.

Catalyst Preparation and Activity Measurement

A 20 wt % $TiO_2$-on-$\gamma$-$Al_2O_3$ support is prepared by the hydrolysis of a solution of $Ti[O(CH_2)_3CH_3]_4$ in the presence of $\gamma$-$Al_2O_3$ (PSD-350 grade from Aluminum Company of America, BET surface area of approximately 350 $m^2$/g, 60-100 mesh). The solid sample is dried in air at about 500° C. for about 6 hours. A 5% $V_2O_5$/20 wt % $TiO_2$-$\gamma$-$Al_2O_3$ is prepared by impregnation in 20% $TiO_2$-$\gamma$-$Al_2O_3$ with an aqueous solution of $NH_4VO_3$ in oxalic acid. A similar procedure is used to prepare 5% $V_2O_5$/$Al_2O_3$ and 5% $V_2O_5$/$TiO_2$ (P25, Degussa, BET surface area of 30.6 $m^2$/g). After impregnation, the catalysts are dried at about 120° C. for about 12 hours and calcined at about 500° C. in oxygen for about 12 hours to decompose the ammonium salt into the corresponding oxide. Palladium is subsequently impregnated in 5% $V_2O_5$/20 wt % $TiO_2$-$\gamma$-$Al_2O_3$ and 20 wt % $TiO_2$-$\gamma$-$Al_2O_3$ using a $Pd(NH_3)_4Cl_2$ aqueous solution. The catalyst is dried at about 120° C. for about 12 hours and calcined at about 500° C. for about 6 hours in oxygen.

The catalytic activity measurements according to the present invention are carried out in a fixed-bed quartz reactor. A typical reactant gas composition comprises: 500 ppm NO, 4000 ppm $H_2$, 0-2000 ppm CO (when used), 5% $O_2$, and the balance He. A 100 mg sample is used in each run. The total flow rate is about 200 ml/min (under ambient conditions). Premixed gases (1.01% NO in He, 5.00% $H_2$ in He, and 1.0% CO in He) are readily available from Matheson Tri-Gas of Irving, Tex. Water vapor is generated by passing He through a heated saturator containing de-ionized water. The NO and $NO_2$ concentrations are continually monitored using a chemiluminescent NO/$NO_x$ analyzer (for example, Thermo Environmental Instruments, Inc., Model 42C). The products are analyzed using a gas chromatograph (Shimadzu, 8A) with a 13X molecular sieve column for $H_2$, CO, and $N_2$ separation and Porapak Q column for $N_2O$. Ammonia formation is monitored by FTIR (Fourier Transform Infrared Spectroscopy). Typically, no ammonia is detected by FTIR in the lean burn conditions. The catalytic activity is based on the calculated $NO_x$ conversion using the following formula.

$$NO_x \text{ conversion} = \frac{inlet NO_x \text{ (ppm)} - outlet NO_x \text{ (ppm)}}{inlet NO_x \text{ (ppm)}} \times 100(\%)$$

The $N_2$ selectivity is calculated as follows:

$$N_2 \text{ selectivity} = \frac{[N_2]}{[N_2] + [N_2O]} \times 100(\%)$$

Since the reactions are carried out at relatively low temperatures, part of the decrease in NO concentration can be attributed to the adsorption of NO onto the catalysts. Thus, to minimize this occurrence, the following is done at the beginning of each example: the catalyst is first purged with reactant gas until the inlet and outlet NO concentrations are equal (i.e., about 500 ppm). The temperature is subsequently raised to the desired level. At each reaction temperature, the NO conversion and product analysis is performed after allowing the reaction to reach steady state (about 1-2 hours, depending on the reaction).

The nitrogen balance is calculated for each step using the following equation: inlet [NO]=outlet [NO]+[$N_2$]+[$N_2O$]. Steady-state kinetic studies for the NO reduction by $H_2$ in the presence of CO and $O_2$ are carried out for the 1% Pd-5% $V_2O_5$/$TiO_2$/$Al_2O_3$ catalyst making use of a fixed-bed, quartz flow reactor, with 5 mg of catalyst used in each run. The NO concentration in an exhaust is simulated by blending different gaseous reactants. The typical reactant gas composition is as follows: 0-5000 ppm $H_2$, 100-500 ppm NO, 0-500 ppm CO, 1-5% $O_2$, and the balance He. The total flow rate is about 500 ml/min (under ambient conditions). The same instrumentation, as described above, is used throughout.

Catalyst Characterization

Powder X-ray diffraction (XRD) measurements are carried out on the catalysts of the present invention using a Rigaku Rotaflex D/Max-C system with a Cu K$\alpha$ ($\lambda$=0.1543 nm) radiation source. The samples are loaded with a depth of 1 mm. In each $H_2$-TPR (temperature-programmed reduction) experiment, a 50 mg sample is loaded into a quartz reactor and pretreated with an $O_2$/He (100 ml/min) flow at about 500° C. for about 0.5 hours. The sample is cooled to room temperature in an $O_2$/He flow. The reduction of the sample is carried out starting at room temperature to about 600° C. in a 5.32% $H_2$/$N_2$ flow (of about 40 ml/min) with a temperature ramp of about 10° C./min. The consumption of $H_2$ is monitored with the use of a thermal conductivity detector. Water produced during the reduction is trapped in a 5 A° molecular sieve column.

Infrared spectra are recorded on a Nicolet Impact 400 FTIR spectrometer with a TGS detector. The samples are prepared as a self-supporting wafer of 1.3 cm diameter. This is achieved by compressing 15 mg of the sample. The wafer is loaded into the IR cell ($BaF_2$ windows). The wafers are pretreated at 573 K in a flow of high purity $O_2$/He for about ½ hour and stepwise cooled to room temperature. At each temperature step, the background spectrum is recorded in flowing $O_2$/He. This spectrum is subsequently subtracted from the sample spectrum obtained at the same temperature step. Thus, the IR absorption features that originated from the structure vibrations of the catalyst are eliminated from the sample spectra. IR spectra are recorded by accumulating 100 scans at a spectra resolution of 4 $cm^1$.

The XRD patterns of the catalysts are shown in FIG. 1. Crystalline PdO phases are not detected in all samples, which indicates that Pd is highly dispersed on the support. Four diffraction peaks with 2$\theta$=25.3, 37.5, 39.4 and 48 respectively, are observed in the titania containing samples. These peaks originate from the anatase form of titania.

Figure 2:
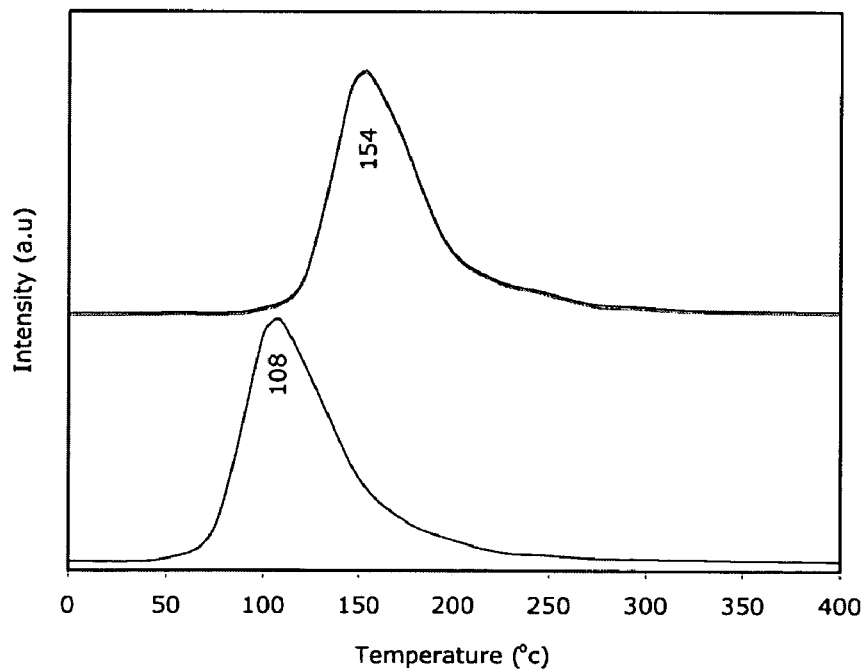
FIG. 2 illustrates TPR profiles of 1% Pd-5% $V_2O_5/TiO_2/Al_2O_3$ (upper) and 1% Pd/$TiO_2/Al_2O_3$ (lower) catalysts.

$H_2$-TPR profiles of 1% Pd-5% $V_2O_5$/$TiO_2$—$Al_2O_3$ and 1% Pd/$TiO_2$—$Al_2O_3$ catalysts prepared are shown in FIG. 2. All samples show one main peak, which can be assigned to the reduction of Pd (II) to Pd (0). For the $V_2O_5$ containing sample, the reduction peak temperature is 46° C. higher than that on $V_2O_5$-free sample. While not being bound by theory, it is believed that the presence of $V_2O_5$ retards the reduction of Pd oxides.

$NO_x$ Reduction on Pd Based Catalysts by $H_2$ in the Presence of Oxygen

Figure 3:
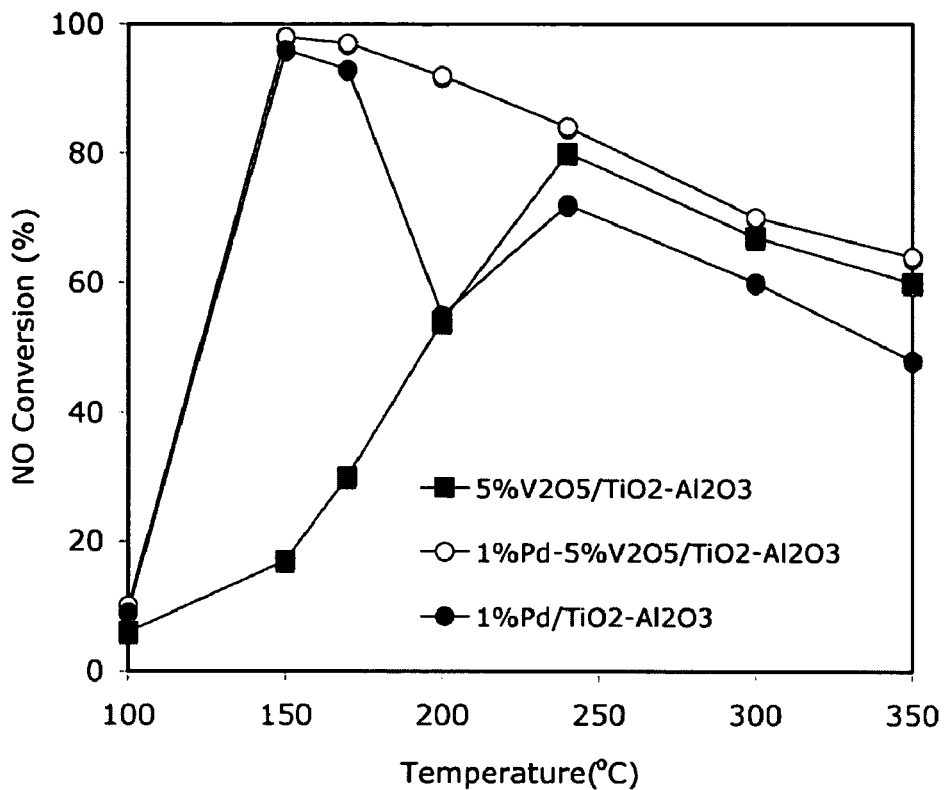
FIG. 3 illustrates NO conversion as a function of temperature over various catalysts. Reaction conditions: 0.1 g catalyst; total flow rate=200 ml/min; [NO]=500 ppm; [$O_2$]=5%; [$H_2$]=4000 ppm; He=balance.

The performance of a range of Pd-based catalysts is shown in FIG. 3. A maximum NO conversion of 98% is achieved at about 150° C. over a 1% Pd-5% $V_2O_5$/$TiO_2$/$Al_2O_3$ catalyst. This reaction displays only one NO conversion peak. Under the same conditions, a 1% Pd/$TiO_2$/$Al_2O_3$ catalyst also shows a high NO conversion. However, two separate NO conversion peaks are observed at 150° C. and 240° C., respectively. While a maximum NO conversion of 80% is obtained over the 5% $V_2O_5$/$TiO_2$/$Al_2O_3$ catalyst, the peak conversion temperature is the same as the second NO conversion peak for the 1% Pd/$TiO_2$/$Al_2O_3$ catalyst. This may indicate that the second NO conversion peak may not depend on the Pd concentration. From FIG. 3, it can be seen that the addition of $V_2O_5$ to the 1%

Pd/TiO$_2$/Al$_2$O$_3$ catalyst increases the NO conversion, especially at temperatures of around 200° C. Thus, the addition of V$_2$O$_5$ widens the high NO conversion temperature window to 140-250° C. (with about 80% NO conversion). The 1% Pd/TiO$_2$/Al$_2$O$_3$ catalyst exhibits a narrower NO conversion temperature window of 140° C.-180° C. Based on the investigated temperature range, the NO conversion order is as follows: 1% Pd-5% V$_2$O$_5$TiO$_2$/Al$_2$O$_3$>1% Pd/TiO$_2$/Al$_2$O$_3$>5% V$_2$O$_5$/TiO$_2$/Al$_2$O$_3$.

Figure 4:
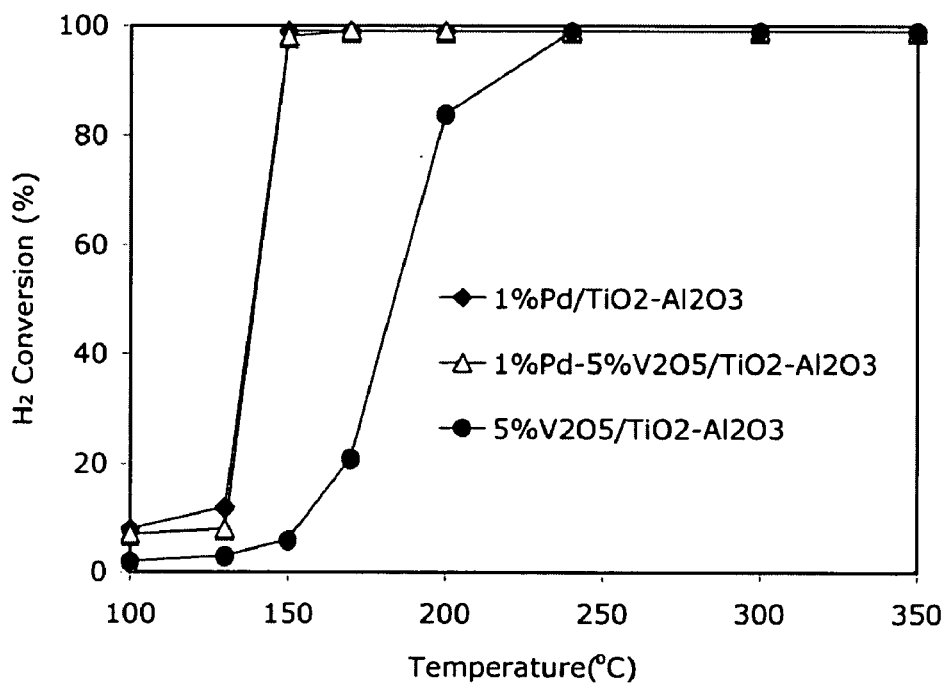
FIG. 4 illustrates $H_2$ conversion as a function of temperature over various catalysts. Reaction conditions: 0.1 g catalyst; total flow rate=200 ml/min; [NO]=500 ppm; [$O_2$]=5%; [$H_2$]=4000 ppm; He=balance.

FIG. 4 illustrates hydrogen conversions as a function of temperature on various TiO$_2$/Al$_2$O$_3$ supported catalysts. The H$_2$ conversion for each catalyst reaches 100% at the temperatures where the maximum NO conversion is observed. On the 1% Pd/TiO$_2$/Al$_2$O$_3$ catalyst, this is achieved at a temperature of 150° C. While for the 1% Pd-5% V$_2$O$_5$/TiO$_2$/Al$_2$O$_3$ catalyst, 98% H$_2$ conversion is reached at 150° C. The 5% V$_2$O$_5$/TiO$_2$/Al$_2$O$_3$ catalyst, on the other hand, reaches complete H$_2$ conversion only at 240° C.

Figure 5:
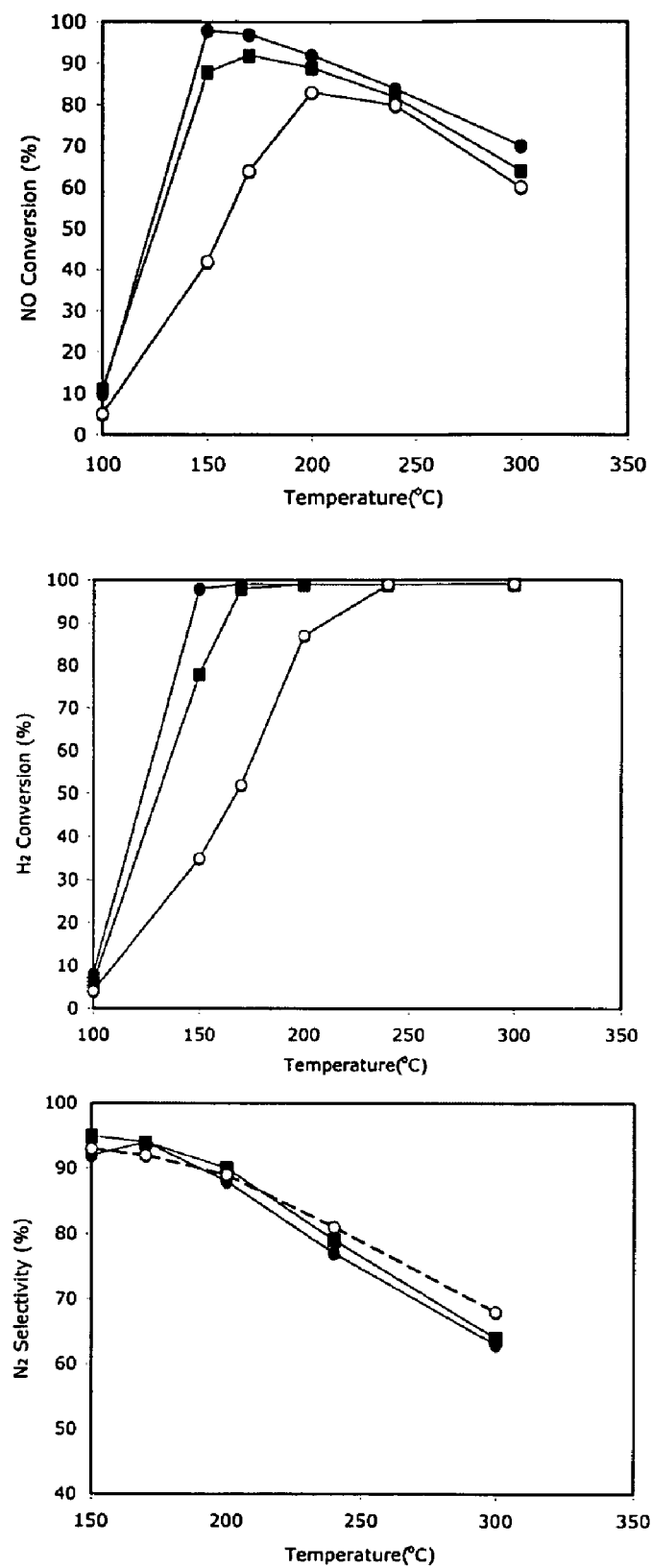
FIG. 5 illustrates effect of space velocity on NO, $H_2$ conversions and $N_2$ selectivity for $H_2$-SCR over 1% Pd-5% $V_2O_5/TiO_2/Al_2O_3$ catalyst. •, $1.0×10^5$ $h^{-1}$; ■, $5.2×10^5$ $h^{-1}$; O, $1.8×10^6$ $h^{-1}$. Reaction conditions: [NO]=500 ppm; [$H_2$]=4000 ppm; [$O_2$]=5%; He=balance.

For the presently preferred catalyst, 1% Pd-5% V$_2$O$_5$/TiO$_2$/Al$_2$O$_3$, the NO—H$_2$—O$_2$ reaction activities including NO conversion, H$_2$ conversion, and N$_2$ selectivity, at various space velocities are shown in FIG. 5. Generally, the space velocity significantly influences the low temperature NO conversion, not the NO conversion in the high temperature range. As the space velocity is increased (1.0×10$^5$ to 1.8×10$^6$ h$^{-1}$), the NO conversion decreases, and NO conversion maximum shifts toward a higher temperature (about 150° C.-200° C.). H$_2$ conversion exhibits a similar trend, namely as the space velocity increases, H$_2$ conversion decreases. The corresponding 100% H$_2$ conversion temperature also increases. No significant space velocity effects are visible on the N$_2$ selectivity at temperatures below 200° C. A significant decrease in N$_2$ selectivity is observed in the temperature range 200° C.-300° C.

Figure 6:
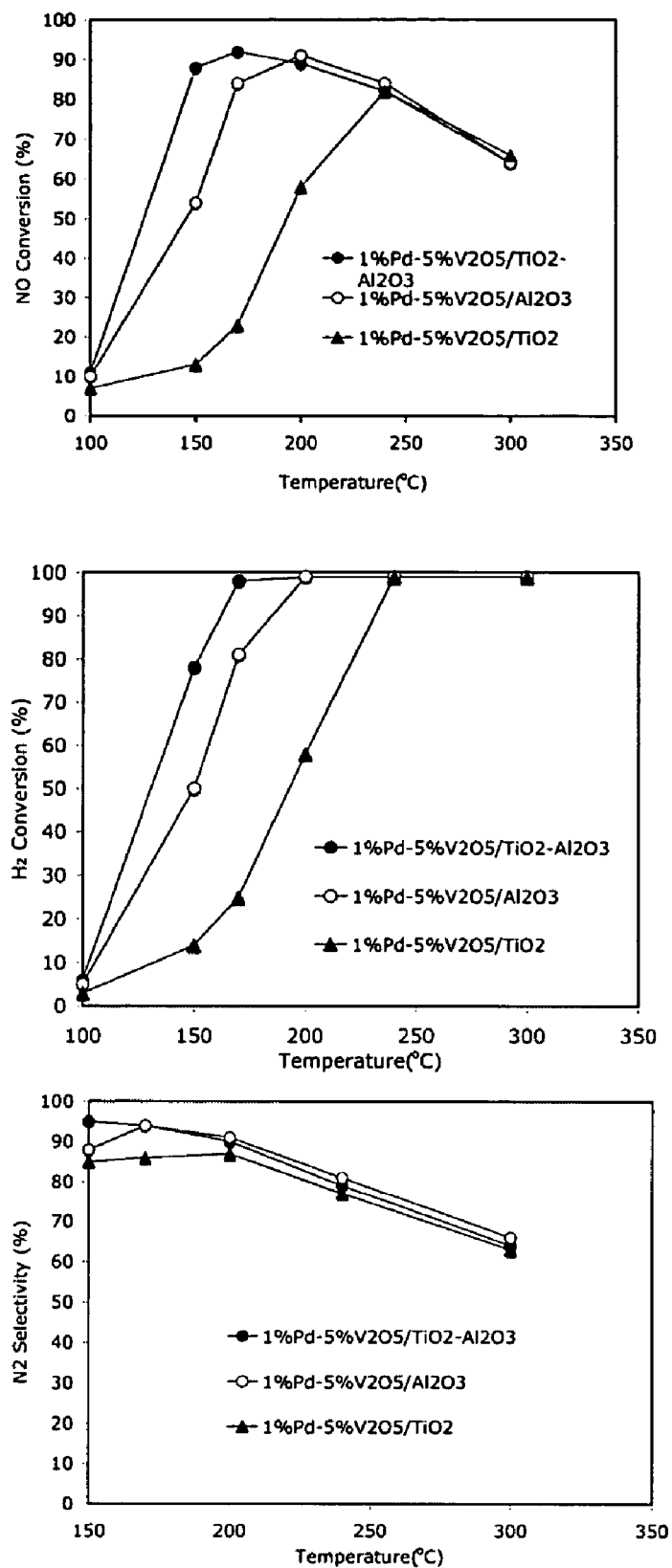
FIG. 6 illustrates NO, $H_2$ conversions and $N_2$ selectivity as functions of temperature over various supported Pd based catalysts. Reaction conditions: 0.05 g catalyst; [NO]=500 ppm; [$H_2$]=4000 ppm; [$O_2$]=5%; He=balance; total flow rate=500 ml/min.

FIG. 6 shows the conversions of NO and H$_2$, as well as the N$_2$ selectivity of various supported Pd catalysts as a function of temperature. As shown, at low temperatures (i.e., less than about 170° C.), the 1% Pd-5% V$_2$O$_5$/TiO$_2$ catalyst has a very low activity, while 1% Pd-5% V$_2$O$_5$/TiO$_2$/Al$_2$O$_3$ catalyst and 1% Pd-5% V$_2$O$_5$/Al$_2$O$_3$ catalyst display relatively high activities under the same conditions.

In the high temperature range (i.e., greater than about 240° C.), all of the samples show similar activities. The order of increasing activity of these Pd based catalysts is: 1% Pd-5% V$_2$O$_5$/TiO$_2$/Al$_2$O$_3$>1% Pd-5% V$_2$O$_5$/Al$_2$O$_3$>1% Pd-5% V$_2$O$_5$/TiO$_2$. The same trend is observed for H$_2$ conversion. The N$_2$ selectivity of different catalysts is also shown in FIG. 6; all samples show a similar N$_2$ selectivity.

Figure 7:
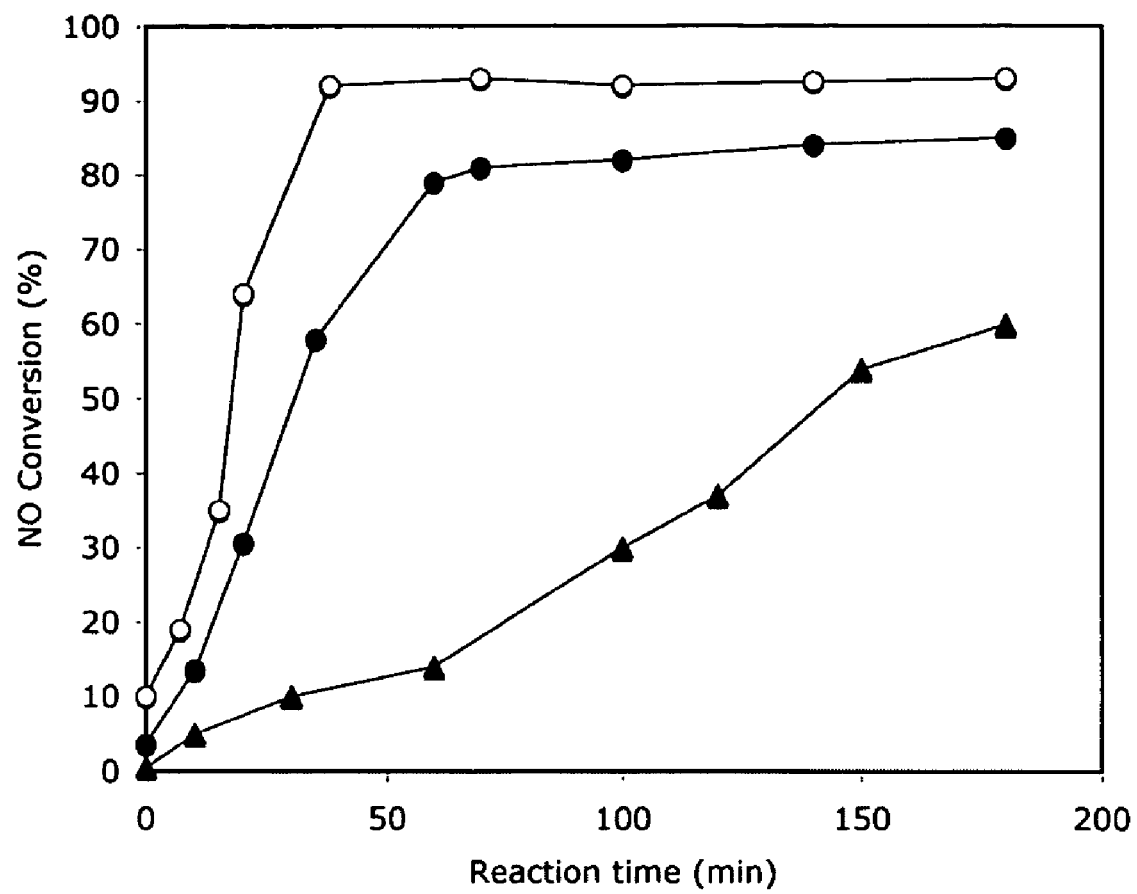
FIG. 7 illustrates NO conversion as a function of time on stream at 170° C. over 1% Pd-5% $V_2O_5/Al_2O_3$(•); at 150° C. over 1% Pd-5% $V_2O_5/Al_2O_3$(▲); and 1% Pd-5% $V_2O_5/TiO_2$—$Al_2O_3$(O) catalysts for $H_2$-SCR. Reaction conditions: 0.05 g catalyst; [NO]=500 ppm; [$H_2$]=4000 ppm; [$O_2$]=5%; He=balance; total flow rate=500 ml/min.

FIG. 7 illustrates the NO conversion as a function of reaction time for catalysts 1% Pd-5% V$_2$O$_5$/Al$_2$O$_3$ (at 150° C. and 170° C.) and 1% Pd-5% V$_2$O$_5$/TiO$_2$—Al$_2$O$_3$ (at 150° C.). At 150° C., the 1% Pd-5% V$_2$O$_5$/TiO$_2$—Al$_2$O$_3$ catalyst has a high NO conversion rate to reach steady state in only 1 hour. A similar trend is observed for the 1% Pd-5% V$_2$O$_5$/Al$_2$O$_3$ catalyst at 170° C. At 150° C., however, the 1% Pd-5% V$_2$O$_5$/Al$_2$O$_3$ catalyst displays a slow NO conversion rate and only reaches 60% NO conversion after three hours. The 1% Pd-5% V$_2$O$_5$/TiO$_2$—Al$_2$O$_3$ catalyst has a higher conversion rate, indicating that modification of Al$_2$O$_3$ with titania has a positive effect on the conversion rates of the catalyst.

Figure 8:
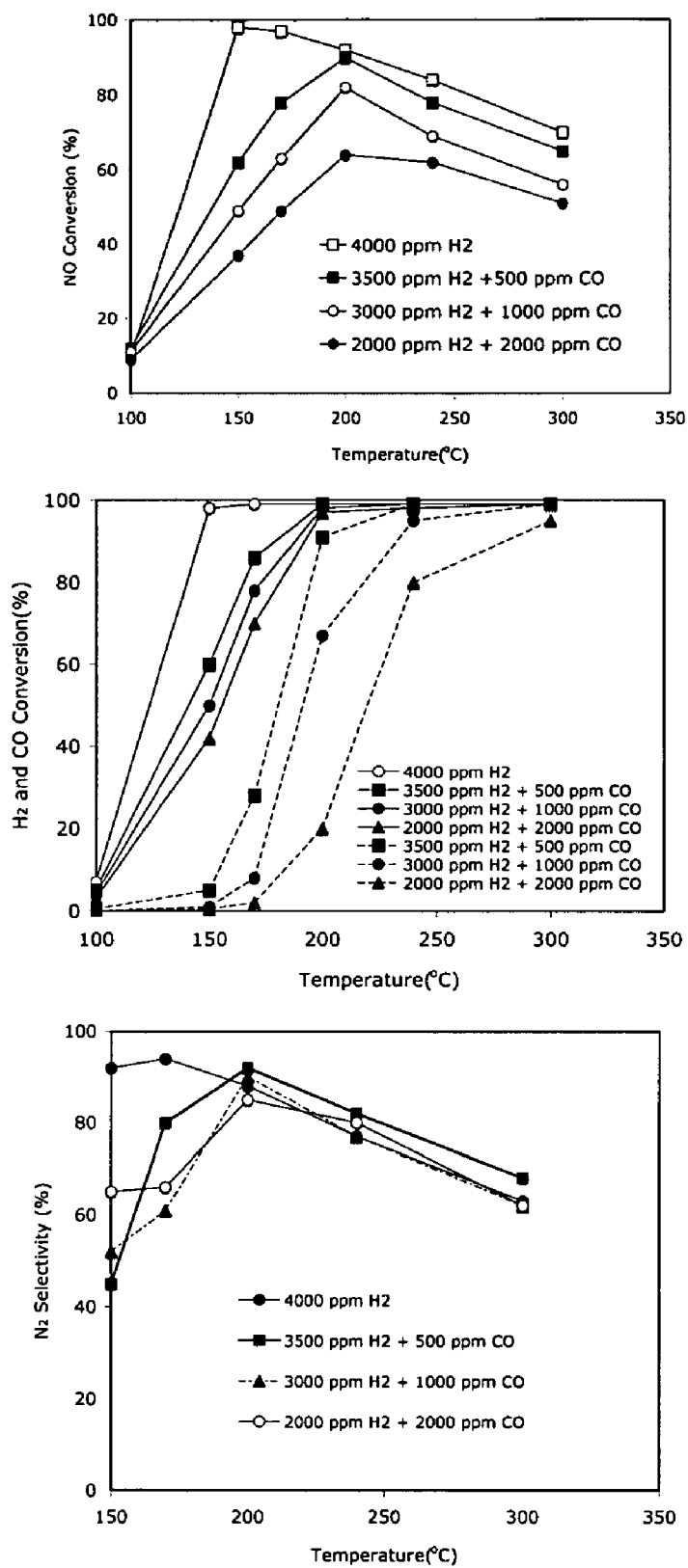
FIG. 8 illustrates NO, $H_2$, CO conversions and $N_2$ selectivity as functions of temperature over 1% Pd-5% $V_2O_5/TiO_2$—$Al_2O_3$ catalyst on different feed compositions. $H_2$ Conversion (solid line), CO conversion (dashed line). Reaction conditions: 0.1 g catalyst; total flow rate=200 ml/min; [NO]=500 ppm; [$O_2$]=5%; [$H_2$]=2000-4000 ppm; [CO]=0-2000 ppm; He=balance.

NO$_x$ Reduction on Pd Based Catalysts by H$_2$ and CO in the Presence of Oxygen In various embodiments, the present invention contemplates an emissions system using CO in the H$_2$-SCR process. FIG. 8 illustrates the influence of CO on the H$_2$-SCR reaction over the 1% Pd-5% V$_2$O$_5$/TiO$_2$—Al$_2$O$_3$ catalyst with the total reductant concentration at about 4000 ppm. This aspect of the present invention surprisingly indicates that the presence of CO decreases the NO conversion, especially in the low temperature range. This result differs from previous theories that predicted enhancement by CO on Pd/TiO$_2$/Al$_2$O$_3$. As the CO concentration is increased, the temperature of maximum NO conversion shifts from 150° C. to 200° C. The presence of CO inhibits the H$_2$ oxidation reaction as the temperature to reach complete oxidation of H$_2$ increases from 170° C. to 200° C. as CO is added to the feed gas. The effect of CO on N$_2$ selectivity is very complex in the low temperature range, while at high temperatures the N$_2$ selectivity appears to be independent of the presence of CO.

Figure 9:
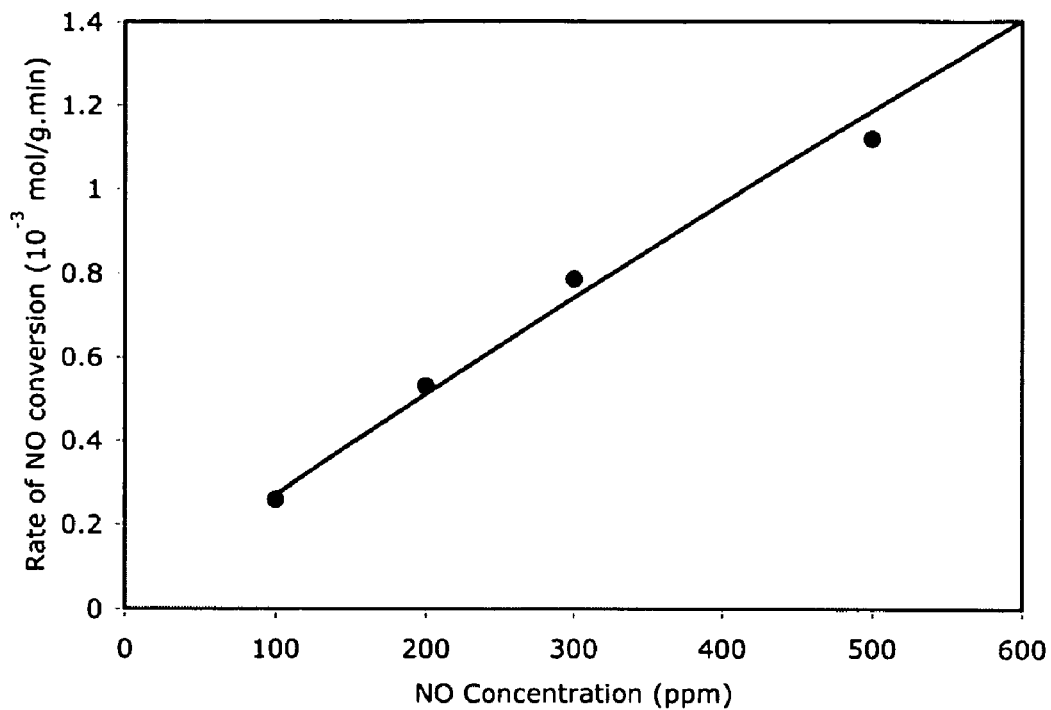
FIG. 9 illustrates dependence of NO conversion rate on NO concentration on 1% Pd-5% $V_2O_5/TiO_2/Al_2O_3$ catalyst at 200° C. Reaction condition: 5 mg catalyst; [$H_2$]=4000 ppm; [CO]=500 ppm; [$O_2$]=5%; He=balance; total flow rate=500 ml/min.

Kinetics Studies for H$_2$-SCR in the Presence of CO and Excess O$_2$ in a Differential Reactor To determine the reaction order with respect to NO, the concentrations of H$_2$, CO, and O$_2$ are kept constant. The concentration of NO is subsequently varied from 100 ppm to 500 ppm. Similarly, to determine the reaction order with respect to H$_2$, the concentration of NO and CO are kept constant, while varying the concentration of H$_2$ between 1000 ppm and 5000 ppm. The flow rate is about 500 ml/min and only 5 mg of catalyst is used, with less than 20% NO conversion obtained at 200° C. Thus, the reactor can be treated as a differential reactor. Experimental results of the rate of NO conversion as a function of NO, CO, H$_2$, and O$_2$ concentrations are presented in FIG. 9-12. FIG. 9 shows that the rate of NO conversion increases linearly as a function of NO concentration. The reaction rate of NO conversion as a function of reactant concentrations can be expressed in Equation 1 as follows:

$$r_{NO} = -k_a[NO]^x[H_2]^y[CO]^z[O_2]^m \quad (1)$$

where r$_{NO}$ is the SCR rate, k$_a$ is the apparent rate constant, and x, y, z, and m are reaction order for NO, H$_2$, CO, and O$_2$, respectively. According to FIG. 9, the reaction order (x) with respect to NO is 0.92, thus making this reaction close to first-order.

Figure 10:
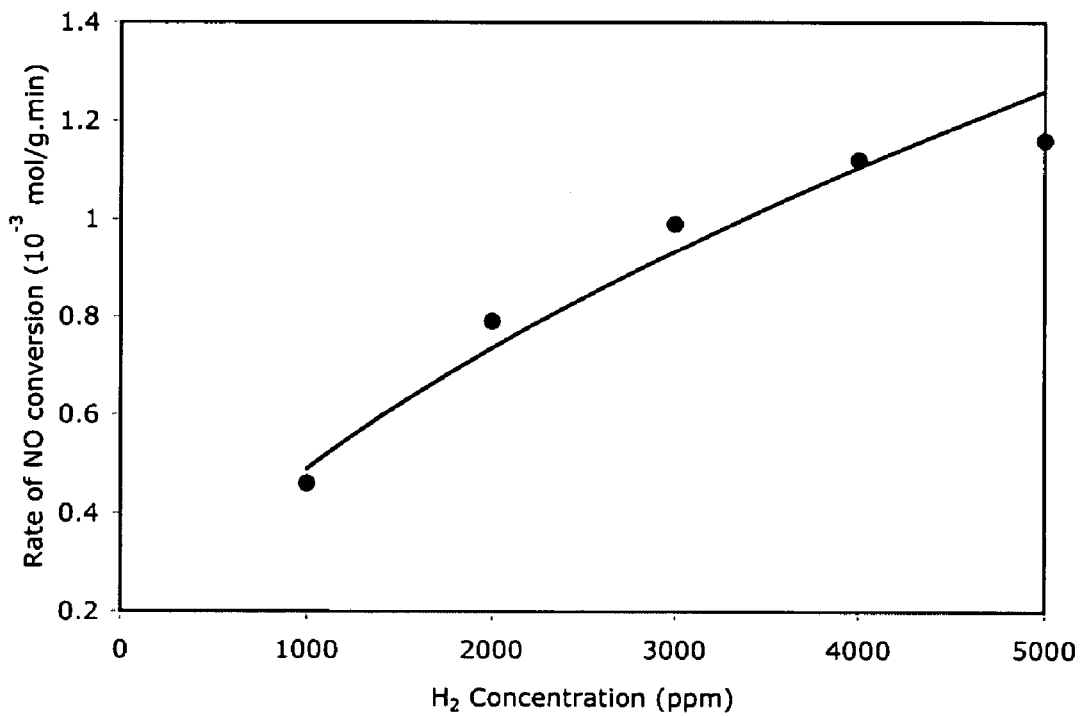
FIG. 10 illustrates dependence of NO conversion rate on $H_2$ concentration for 1% Pd-5% $V_2O_5/TiO_2/Al_2O_3$ catalyst at 200° C. Reaction condition: 5 mg catalyst; [NO]=500 ppm; [CO]=500 ppm; [$O_2$]=5%; He=balance; total flow rate=500 ml/min.
Figure 11:
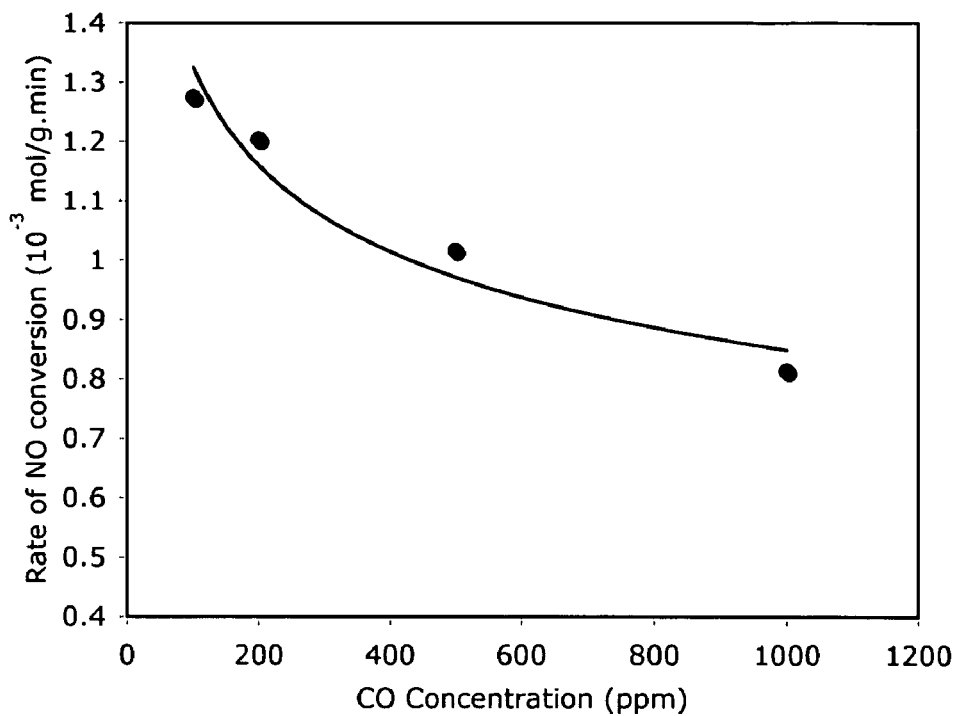
FIG. 11 illustrates dependence of NO conversion rate on CO concentration for 1% Pd-5% $V_2O_5/TiO_2/Al_2O_3$ catalyst at 200° C. Reaction condition: 5 mg catalyst; [$H_2$]=4000 ppm; [NO]=500 ppm; [$O_2$]=5%; He=balance; total flow rate=500 ml/min.
Figure 12:
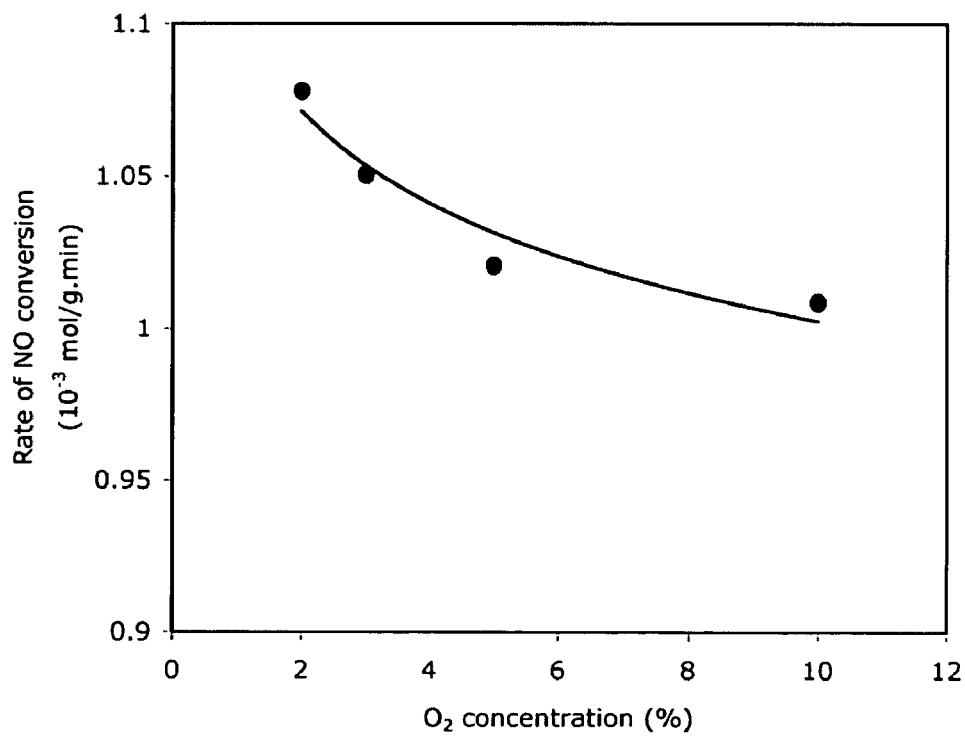
FIG. 12 illustrates dependence of NO conversion rate on $O_2$ concentration for 1% Pd-5% $V_2O_5/TiO_2/Al_2O_3$ catalyst at 200° C. Reaction condition: 5 mg catalyst; [$H_2$]=4000 ppm; [NO]=500 ppm; [CO]=500 ppm; He=balance; total flow rate=500 ml/min.

The rate of NO conversion as a function of H$_2$ concentration is shown in FIG. 10, and is found to increase with increasing H$_2$ concentrations. The reaction order (y) with respect to the H$_2$ concentration is calculated to be 0.6. FIG. 11 shows the rate of NO conversion as a function of CO concentration. The rate of NO conversion decreases with CO concentration. Thus, CO inhibits the reaction, which can be attributed to the competitive adsorption between NO and H$_2$. The reaction order (z) with respect to CO concentration is calculated to be −0.18. The rate of NO conversion as a function of O$_2$ concentration is shown in FIG. 12 (500 ppm NO, 4000 ppm H$_2$, 500 ppm CO). When the O$_2$ concentration increases from about 2% to 10%, the NO consumption rate slightly decreases. The reaction order (m) with respect to O$_2$ is calculated to be −0.04.

According to the above results, the H$_2$-SCR reaction in the presence of CO and excess O$_2$ can be considered to be approximately first-order with respect to NO, 0.6-order to H$_2$, −0.18-order to CO and −0.04-order to O$_2$. The rate of NO conversion can be expressed in Equation 2 as follows:

$$r_{NO} = -k_a[NO][H_2]^{0.6}[CO]^{-0.18}[O_2]^{-0.04} \quad (2)$$

Effects of Water and SO$_2$ on the H$_2$-SCR Reaction

Figure 13:
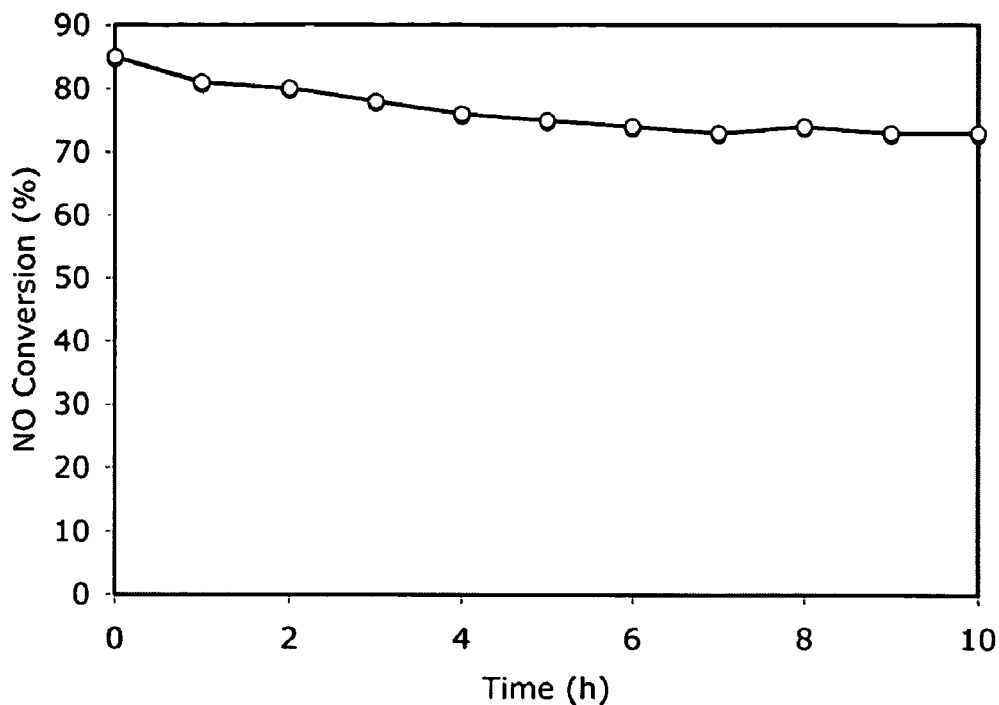
FIG. 13 illustrates effect of $H_2O$ on NO conversion over 1% Pd-5% $V_2O_5$/$TiO_2$/$Al_2O_3$ catalyst at 200° C. Reaction condition: 0.05 g catalyst; [$H_2$]=4000 ppm; [NO]=500 ppm; [$O_2$]=5%; [$H_2O$]=2.3%; He=balance; total flow rate=500 ml/min.

Water vapor is a major component in diesel engine exhaust and often leads to catalyst deactivation. Resistance of the NO$_x$ abatement catalyst to deactivation by water vapor is an important factor. FIG. 13 shows the effect of H$_2$O on the SCR activity of the Pd—V$_2$O$_5$/TiO$_2$—Al$_2$O$_3$ catalyst. It should be noted that before the addition of water, the SCR reaction is allowed to stabilize for one hour at 200° C.

Figure 14:
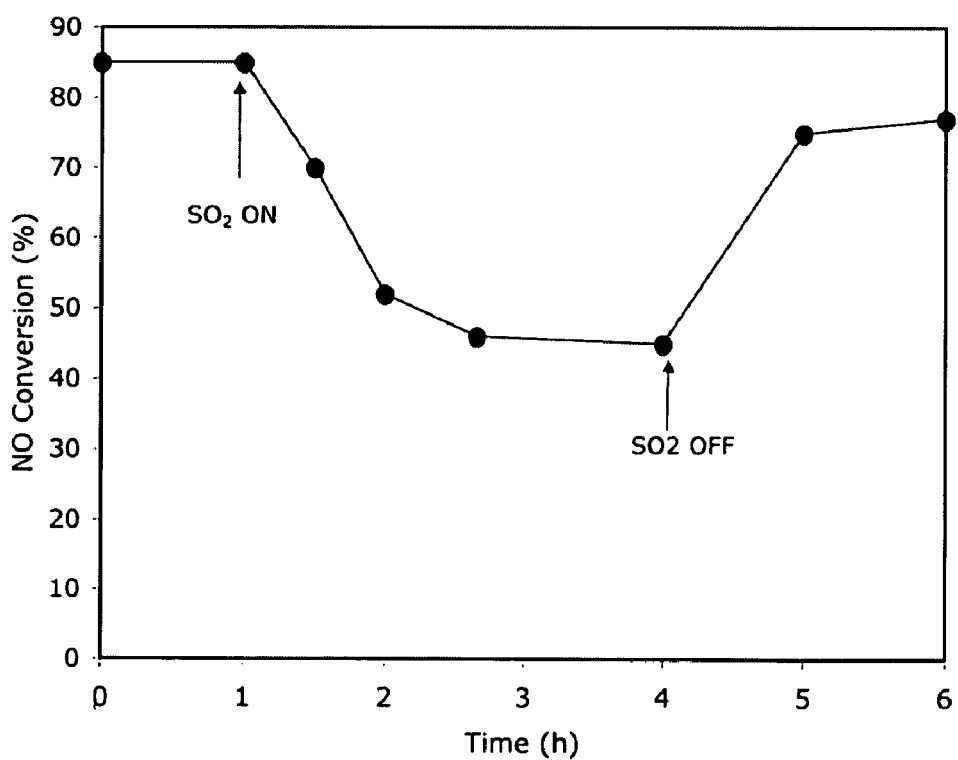
FIG. 14 illustrates effect of $SO_2$ on NO conversion over 1% Pd-5% $V_2O_5$/$TiO_2$/$Al_2O_3$ catalyst at 200° C. Reaction condition: 0.05 g catalyst; [$H_2$]=4000 ppm; [NO]=500 ppm; [$O_2$]=5%; [$SO_2$]=20 ppm; He=balance; total flow rate=500 ml/min.

The addition of 2.3% $H_2O$ affects only a barely detectable decrease in the NO conversion. Upon removal of the water vapor, the activity is rapidly restored to its original level. The effect of $SO_2$ on the SCR activity is another important factor in the $H_2$-SCR reaction due to the presence, although very small, of sulfur in the diesel fuel. FIG. 14 indicates the effect of $SO_2$ on SCR activity of the Pd—$V_2O_5$/$TiO_2$—$Al_2O_3$ catalyst. Results indicate that a 20 ppm $SO_2$ concentration at 200° C. rapidly decreases the NO conversion rate within the first 2 hours of the reaction, and the reaction slowly stabilizes to yield a 46% conversion (down from 85%) in about 4 hours. Removal of the $SO_2$ feed restored the activity to about 90%.

FTIR Studies

Figure 15:
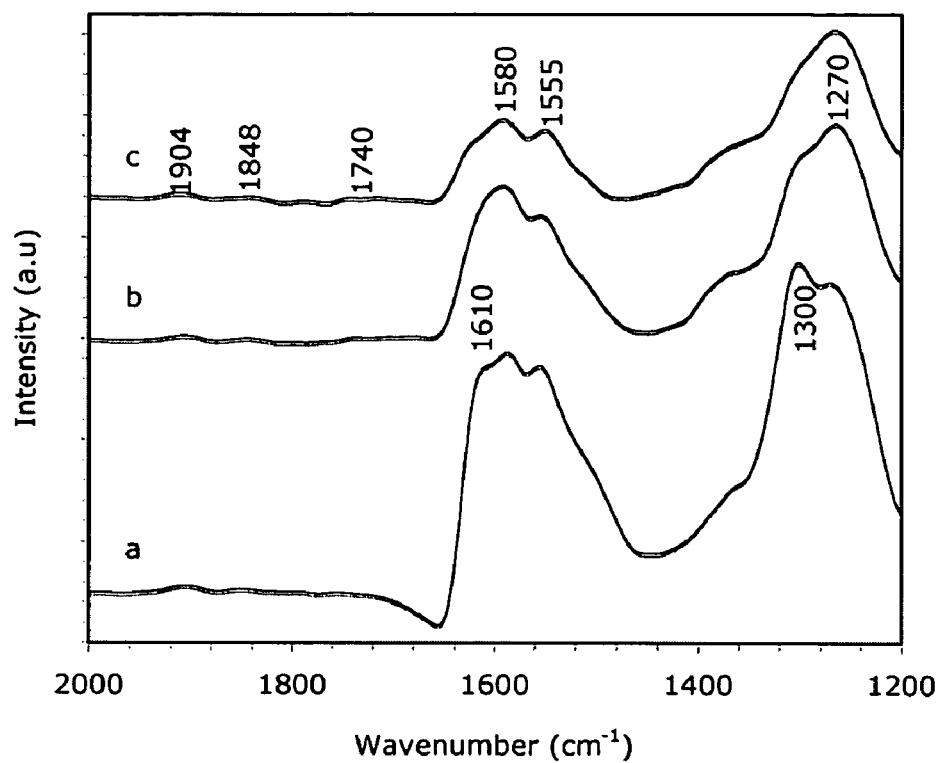
FIG. 15 illustrates FTIR spectra obtained at different temperatures in a flow containing 4000 ppm $H_2$+500 ppm NO+5% $O_2$ over 1% Pd/$TiO_2$—$Al_2O_3$. The temperatures include: a) 150° C.; b) 200° C.; and c) 240° C.

FIG. 15 shows the FTIR spectra obtained at 150° C., 200° C., and 240° C. (4000 ppm $H_2$+500 ppm NO+5% $O_2$) over the 1% Pd/$TiO_2$—$Al_2O_3$ catalyst. At 150° C., two broad peaks are present at 1600 $cm^{-1}$ and 1300 $cm^{-1}$. The various bands between 1600-1550 $cm^{-1}$ and 1300 $cm^{-1}$ observed may be assigned to the asymmetric and symmetric stretching modes of variously coordinated nitrates. The bands at 1904 $cm^{-1}$ and 1848 $cm^{-1}$ are attributed to gas phase or weakly adsorbed NO. The band at 1610 $cm^{-1}$ can be assigned to adsorbed $NO_2$. The band at 1270 $cm^{-1}$ is attributed to the deformation modes of adsorbed $NH_3$. Another band at 1620 $cm^{-1}$ due to the deformation modes is barely detected because of overlapping by the band for nitrate. A very weak band at 1740 $cm^{-1}$ may be assigned to $Pd^0$—NO. The intensity of all the bands associated with nitrates and nitrite decreases as the temperature is increased from 150 to 240° C. while the band at 1270 $cm^{-1}$ due to adsorbed $NH_3$ intensifies and dominates at high temperatures.

Figure 16:
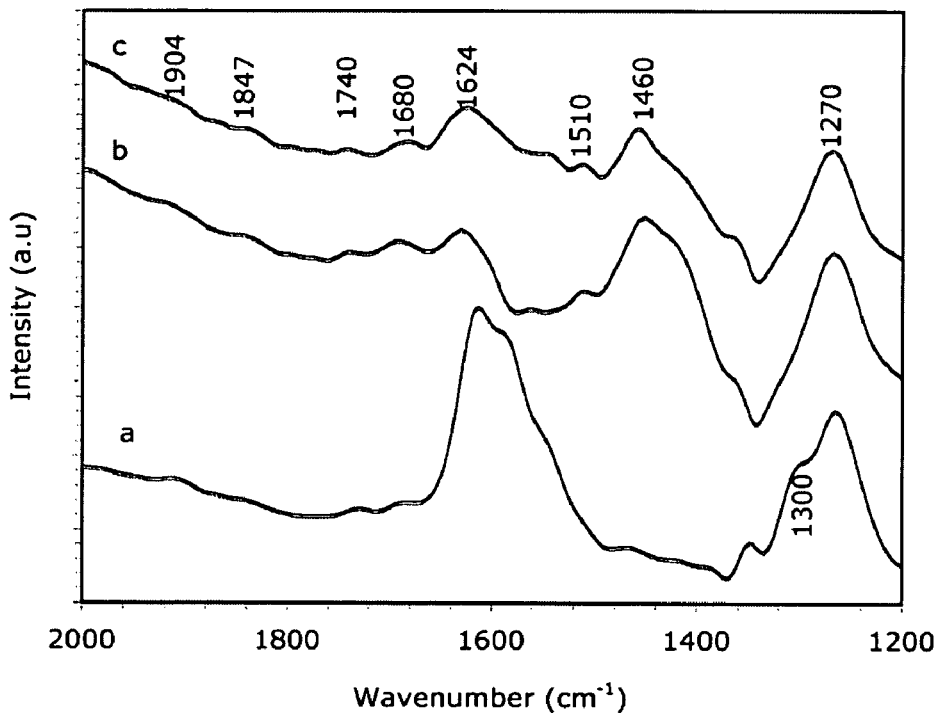
FIG. 16 illustrates FTIR spectra obtained at different temperatures in a flow containing 4000 ppm $H_2$+500 ppm NO+5% $O_2$ over 1% Pd-5% $V_2O_5$/$TiO_2$—$Al_2O_3$. The temperatures include: a) 150° C.; b) 200° C.; and c) 240° C.

The corresponding FTIR spectra obtained over 1% Pd-5% $V_2O_5$/$TiO_2$—$Al_2O_3$ are shown in FIG. 16. At 150° C. (spectrum of FIG. 16), the bands due to $Pd^0$—NO (1740 $cm^{-1}$), gas phase or weakly adsorbed NO (1904 and 1837 $cm^{-1}$), $NO_2$ (1611 $cm^{-1}$), and nitrate (1583, 1348, and 1300 $cm^{-1}$) are also observed similar to the corresponding spectra in FIG. 15. Two new weak bands at 1460 and 1680 $cm^{-1}$ are observed, which are assigned to the symmetric and asymmetric bending modes of $NH_4^+$. With increasing temperature, the bands related to nitrates/nitrite decrease significantly, while the bands related to ammonium and ammonia increase first at 200° C. and decrease slightly at 240° C. As the temperature is increased from 150° C. to 240° C., two significant differences are observed. First, the intensity of the bands increases markedly due to $NH_4^+$. Second, a new band at 1510 $cm^{-1}$ is formed due to amide ($NH_2$). From FIGS. 15 and 16, it can be seen that a significant amount of $NH_4^+$ is formed at temperatures greater than about 200° C. on 1% Pd-5% $V_2O_5$/$TiO_2$—$Al_2O_3$ compared to that on 1% Pd/$TiO_2$—$Al_2O_3$.

Figure 17:
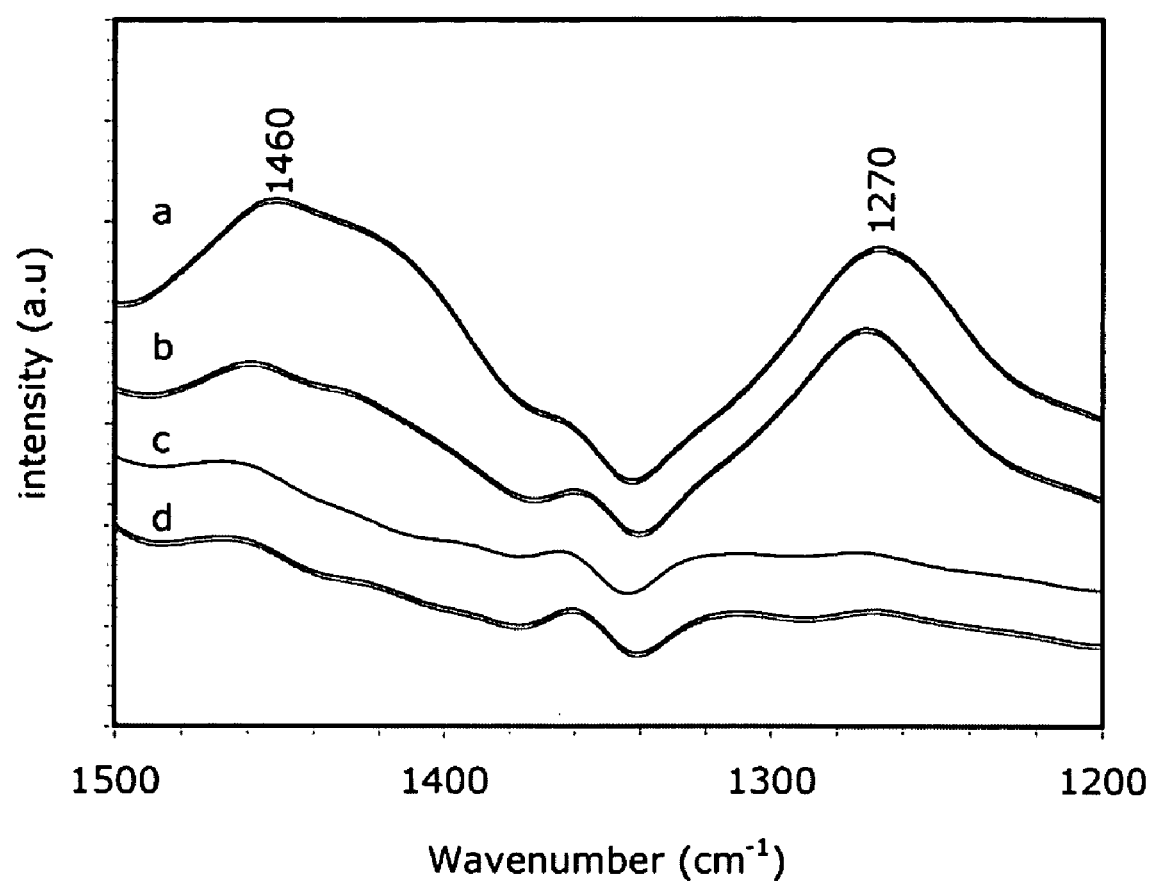
FIG. 17 illustrates changes in the FTIR spectra of $NH_3$ and $NH_4^+$ upon switching the gas flow from (4000 ppm $H_2$+500 ppm NO+5% $O_2$) to (500 ppm NO+5% $O_2$) over 1% Pd-5% $V_2O_5$/$TiO_2$—$Al_2O_3$ catalyst. The time after switching gas flow is as follows: a) 0 min; b) 1.5 min; c) 3 min; and d) 10 min.

In order to study the reactivity of $NH_4^+$ and $NH_3$ with NO in the presence of $O_2$, FTIR spectra (FIG. 17) are obtained over the 1% Pd-5% $V_2O_5$/$TiO_2$—$Al_2O_3$ catalyst at 200° C. following a switch from a feed gas containing 4000 ppm $H_2$, 500 ppm NO, and 5% $O_2$, to one containing 500 ppm NO and 5% $O_2$. After 1.5 min, the band at 1460 $cm^1$ due to $NH_4^+$ almost disappears (due to reaction with NO+$O_2$), while the band at 1270 $cm^{-1}$, due to $NH_3$, has a slight variation. The result indicates that $NH_4^+$ is more reactive than $NH_3$ in the SCR reaction. After about 10 min, both $NH_4^+$ and $NH_3$ peaks disappear, indicating that both species can react with NO+$O_2$ at different rates.

Thus, in various embodiments, the 1% Pd-5% $V_2O_5$/$TiO_2$/$Al_2O_3$ catalyst offers significantly high NO conversions using $H_2$ and CO as a reducing agent in the presence of excess oxygen and at a very high space velocity. Compared to others, this catalyst exhibits a higher NO reduction activity as well as a wider operating temperature window.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An emissions system for selective catalytic reduction of nitrous oxides ($NO_x$) in lean-burn diesel engine exhaust, the system comprising:
   a catalytic converter having at least one inlet, at least one outlet, and an interior working environment adapted to receive and dispel an exhaust;
   a source of a reducing agent comprising $H_2$ and CO;
   a catalyst disposed in the interior working environment, the catalyst comprising a compound represented by the formula:
   X % Pd—Y % $V_2O_5$/Z, where X is a weight percent between about 0.1 to about 2.0, Y is a weight percent between about 0.1 to about 7.0, and Z is a high surface area oxide support material, and
   a mixing element having a first input coupled to the reducing agent source, a second input coupled for receipt of diesel engine exhaust, and an output for injecting the diesel engine exhaust mixed with the reducing agent into the interior working environment of the converter where the catalyst reduces nitrous oxides present in the exhaust.

2. A system according to claim 1, wherein the oxide support material is selected from the group consisting of $TiO_2$, $Al_2O_3$, $TiO_2$—$Al_2O_3$, Zeolites, Ti-PILC, and combinations thereof.

3. A system according to claim 1, wherein the oxide support material comprises $TiO_2$—$Al_2O_3$.

4. A system according to claim 1, wherein the oxide support material is present in an amount having a loading per unit volume of between about 0.5 to about 10 $g/in^3$.

5. A system according to claim 1, wherein the catalyst comprises 1% Pd-5% $V_2O_5$/$TiO_2$—$Al_2O_3$.

6. A system according to claim 1, having a $NO_x$ reduction efficiency of at least about 87%.

7. A system according to claim 6, having a NOx reduction efficiency of greater than about 95%.

8. A system according to claim 1, operating at a temperature between about 125 and about 650° C.

9. A system according to claim 1, wherein the reducing agent comprises a ratio of $H_2$:CO of about 3:1.

10. A system according to claim 1, wherein the reducing agent further comprises at least one hydrocarbon.

11. A system according to claim 1, further comprising a fuel reformer located on-board a vehicle for producing the reducing agent by converting diesel fuel, oxygen, and moisture into $H_2$ and CO.

12. A system according to claim 1, wherein the catalyst further comprises at least one promoter selected from the group consisting of: Ce, Mn, Zr, La, Gd, Nb, Pr, Nd, Sm, Eu, and combinations thereof.

13. A system according to claim 12, wherein the at least one promoter is present in an amount between about 0.01 to about 20% by weight.

14. A system according to claim 1, operating with the exhaust having a space velocity through the interior working environment of between about 9,000 and about 70,000 $hr^{-1}$.

15. A system according to claim 1, operating with the exhaust having a flow rate of between about 200 and about 700 kg/hr.

16. A system according to claim 1, wherein the catalyst comprises a honeycomb structure.

17. A method of selective catalytic reduction of nitrous oxides (NOx) in lean burn diesel engine exhaust, the method comprising:

providing a catalytic converter having at least one inlet, at least one outlet, and an interior working environment housing a catalyst and configured to receive and dispel exhaust;

mixing a diesel engine exhaust with a reducing agent comprising $H_2$ and CO; and injecting the mixture into the interior working environment of the converter, wherein nitrous oxides present in the exhaust are reduced by the catalyst comprising a compound represented by the formula:

X % Pd—Y % $V_2O_5$/Z, where X is a weight percent between about 0.1 to about 2.0, Y is a weight percent between about 0.1 to about 7.0, and Z is a high surface area oxide support material.

18. A method according to claim 17, wherein the catalyst comprises 1% Pd-5% $V_2O_5$/$TiO_2$—$Al_2O_3$.

19. A method according to claim 17, wherein the reducing agent comprises $H_2$ and CO at a ratio of about 3:1.

20. A method according to claim 17, wherein the catalyst further comprises at least one promoter selected from the group consisting of: Ce, Mn, Zr, La, Gd, Nb, Pr, Nd, Sm, Eu, and combinations thereof.

21. A method according to claim 20, wherein the at least one promoter is present in an amount between about 0.01 to about 20% by weight.

* * * * *

UNITED STATES PATENT AND TRADEMARK OFFICE
CERTIFICATE OF CORRECTION

PATENT NO. : 7,712,308 B2
APPLICATION NO. : 11/269124
DATED : May 11, 2010
INVENTOR(S) : Fabrizio C. Rinaldi et al.

Page 1 of 1

It is certified that error appears in the above-identified patent and that said Letters Patent is hereby corrected as shown below:

Col. 2, line 15: "$V_2O_5TiO_2/Al_2O_3$" should be --$V_2O_5/TiO_2/Al_2O_3$--.

Col. 4, line 11: "0:1" should be --0.1--.

Col. 9, line 57: "$cm^1$" should be --$cm^{-1}$--.

Signed and Sealed this

Seventh Day of September, 2010

David J. Kappos
*Director of the United States Patent and Trademark Office*